US007741379B2

(12) United States Patent
Bhatt

(10) Patent No.: US 7,741,379 B2

(45) Date of Patent: Jun. 22, 2010

(54) SYSTEM AND A METHOD FOR A UV CURABLE INK HAVING INFRARED SENSITIVITY

(75) Inventor: Jayprakash C. Bhatt, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1133 days.

(21) Appl. No.: 11/069,868

(22) Filed: Mar. 1, 2005

(65) Prior Publication Data

US 2006/0199874 A1 Sep. 7, 2006

(51) Int. Cl.
*C08F 2/50* (2006.01)

(52) U.S. Cl. .......................... 522/75; 522/78; 522/79; 522/182

(58) Field of Classification Search .................. 522/75, 522/182, 79, 78

See application file for complete search history.

(56) References Cited

U.S. PATENT DOCUMENTS

| | | | | |
|---|---|---|---|---|
| 6,110,987 | A | 8/2000 | Kamata et al. | |
| 6,861,201 | B2 * | 3/2005 | Weed et al. | 430/285.1 |
| 6,974,661 | B2 * | 12/2005 | Gore et al. | 430/343 |
| 7,141,360 | B2 * | 11/2006 | Kasperchik et al. | 430/343 |
| 2003/0108708 | A1 | 6/2003 | Anderson et al. | |

FOREIGN PATENT DOCUMENTS

WO WO 2006/001814 A 1/2006

OTHER PUBLICATIONS

"Infrared Absorbing Dyes", Matsuoka, Masaru, ed., Plenum Press (1990)(ISBN 0-306-43478-4).

* cited by examiner

*Primary Examiner*—Susan W Berman

(57) ABSTRACT

An ultraviolet (UV) curable ink having infrared (IR) sensitivity includes a UV light curable matrix, a UV photoinitiator, and an IR sensitive dye.

4 Claims, 2 Drawing Sheets

SYSTEM AND A METHOD FOR A UV CURABLE INK HAVING INFRARED SENSITIVITY

BACKGROUND

Infrared (IR) sensors and associated infrared sensitive inks have traditionally been used for tracking and authenticating a number of different objects. More specifically, labels, barcodes, or other identifiable markings formed from infrared sensitive inks have been formed on the surface of a number of objects. Once marked, objects could then be illuminated with IR light and examined by an infrared sensor to authenticate or track the object.

While traditional methods for tracking and authenticating objects with infrared sensors and associated infrared sensitive inks have been used, these traditional methods have a number of limitations. Specifically, water-based inks containing water soluble IR sensitive dyes have durability and water fastness limitations. Similarly, solvent-based inks containing solvent soluble IR dyes have manufacturing and environmental limitations due to solvent emission. UV curable inks provide unique benefits of print durability as well as environmental friendliness by eliminating solvent emissions. However, many of the IR dyes tend to bleach or experience photo chemical degradation upon exposure to high intensity radiation used for curing UV curable inks.

SUMMARY

An ultraviolet (UV) curable ink having infrared (IR) sensitivity includes an ultraviolet (UV) light curable matrix, a UV photoinitiator, and an infrared sensitive dye.

BRIEF DESCRIPTION OF THE DRAWINGS

The accompanying drawings illustrate various embodiments of the present system and method and are a part of the specification. The illustrated embodiments are merely examples of the present system and method and do not limit the scope thereof.

Throughout the drawings, identical reference numbers designate similar, but not necessarily identical, elements.

DETAILED DESCRIPTION

An exemplary formulation of UV curable inks containing IR dyes which retain their IR sensitivity (i.e. do not undergo photochemical degradation) even after exposure to high intensity radiation used for curing the ink is disclosed herein. More specifically, according to one exemplary embodiment, a UV curable ink containing IR dyes which retain their IR sensitivity includes a UV curable matrix, a UV photoinitiator, and an IR sensitive dye. According to this exemplary embodiment, the IR dye may be any number of infrared sensitive or near infrared sensitive dyes.

As used in the present specification and the appended claims, the term "ultraviolet curable ink" or "UV curable ink" is meant to be understood broadly as referring to any formulation of ink including a component that is configured to harden and/or cure when exposed to ultraviolet radiation. Additionally, the term "infrared sensitive dye" or "IR sensitive dye" is meant to be understood broadly as a dye that absorbs light in the infrared light spectrum (light having a wavelength from approximately 1 micron to 1 mm). Similarly, the term "near infrared sensitive dye" is meant to be understood as any dye that absorbs light having a wavelength ranging from approximately 0.7 microns to approximately 3 microns.

In the following description, for purposes of explanation, numerous specific details are set forth in order to provide a thorough understanding of the present system and method for a UV curable ink having IR sensitivity. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Figure 1:
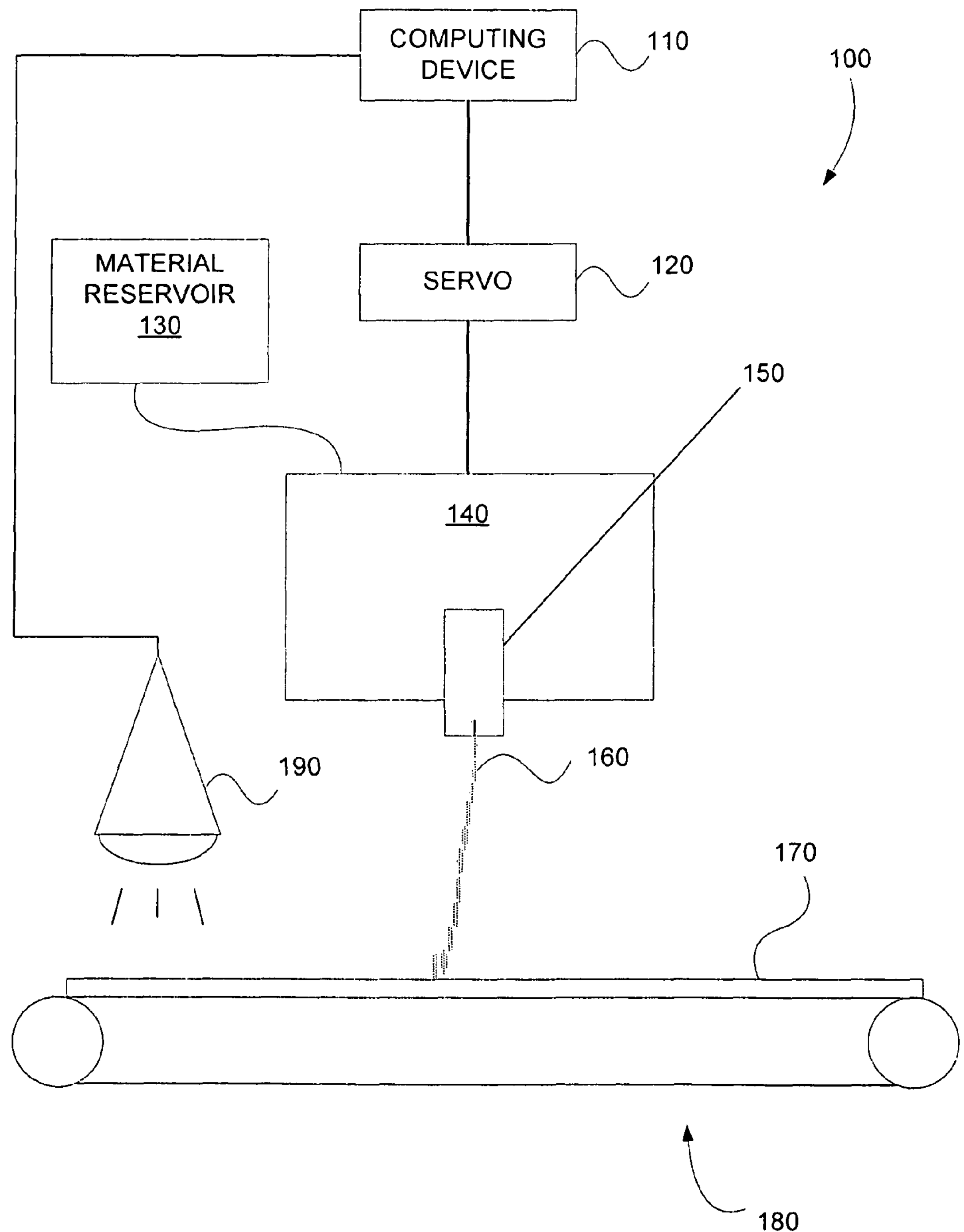
FIG. 1 is a perspective view of an ink dispensing apparatus, according to one exemplary embodiment.

FIG. 1 illustrates the components of the present system that facilitate reception of the UV curable ink having IR sensitivity (160) onto the ink receiving medium (170). As shown in FIG. 1, a medium transport system (180) including a number of positioning rollers and/or belts may transport and positionally secure an ink receiving medium (170) during a printing operation. Alternatively, any number of belts, rollers, substrates, or other transport devices may be used to transport and/or positionally secure the ink receiving medium (170) during a printing operation, as is well known in the art. The UV curable ink having IR sensitivity may be applied to the ink receiving medium by any number of printing methods known in the art such as inkjet, flexographic, screen printing, or thermal transfer.

Moreover, a radiation applicator (190) is also shown. The radiation applicator shown in FIG. 1 is configured to apply radiation to dispensed UV curable ink (160) after deposition. Once deposited, the UV curable ink having IR sensitivity (160) may be cured through the application of the UV rays. Additionally, the radiation applicator (190) may be any device configured to apply ultraviolet (UV) or other radiation sufficient to set or cure deposited UV curable ink having IR sensitivity (160). The radiation applicator (190) may be a separate light exposer or scanning unit configured to flood expose all or selective portions of deposited UV curable ink having IR sensitivity (160).

The formation and composition of the UV curable ink having IR sensitivity (160) will now be described in further detail below.

Exemplary Composition

According to one exemplary embodiment, the present UV curable ink having IR sensitivity includes at least three components: a UV curable matrix, a UV photoinitiator, and an IR dye. Additional components may also be added to the present UV curable ink including, but in no way limited to, organic or inorganic dyes or pigments to selectively modify the color and appearance of the UV curable ink, fillers, salts, surfactants, biocides, buffers, viscosity modifiers, sequestering agents, stabilizing agents, etc. The individual components of the present UV curable ink will be described in further detail below.

The UV Curable Matrix

According to the present exemplary embodiment, the present UV curable ink having IR sensitivity includes a UV curable matrix. Upon deposition of the image forming UV curable ink having IR sensitivity, the UV curable matrix provides a binding matrix that positionally secures the IR dye dispersed in the UV curable ink. Additionally, once cured, the UV curable matrix forms a protective coating around the IR dye. As illustrated in FIG. 1, a radiation applicator (190) may be used to initiate the UV curing process. More specifically, during the UV curing process, the polymers of the UV curable matrix are cross linked to form a substantially continuous structure that surrounds the IR dye.

According to one exemplary embodiment, the UV curable matrix may include a blend of UV curable monomers, dimers and oligomers of different viscosities. The UV curable material is selected to be a blend of acrylate functionality such as monofunctional, difunctional, trifunctional and multifunctional acrylates. Further, the matrix may contain various UV curable dilutents of low viscosity & functionality to give the final ink a viscosity suitable for a desired printing process. As mentioned previously, the present UV curable ink may be incorporated with any number of ink dispensing mechanisms. By varying the quantity of UV curable dilutents of low viscosity and/or molecular weight, the viscosity of the resulting ink may be modified to match a desired ink dispensing mechanism or other application. Further, the addition of monofunctional, difunctional, trifunctional and multifunctional acrylates balances cure density while adding lateral strength to the resulting UV curable matrix.

According to one exemplary embodiment, the UV curable matrix may include any number of epoxy and/or acrylate oligomers. The curable matrix may include, but is in no way limited to, bis-A epoxy acrylate, bis-A epoxy acrylate with 40% tripropylene glycol diacrylate, bis-A epoxy acrylate with 20% tripropylene glycol diacrylate, aromatic epoxy acrylate, polyethylene acrylate oligomer, aliphatic urethane acrylate oligomer with bound silicone, epoxy acrylate, metallic diacrylate, DEG diacrylate, polyethyleneglycol (PEG) 600 diacrylate, 1,4-butanediol diacrylate, 1,6-hexanediol diacrylate, ethyoxylated TMP-triacrylate, pentaerythritol triacrylate, tetrahydrofurfuryl acrylate, metallic acrylate, 2-(2-ethoxy ethoxy)ethyl acrylate, and mixtures thereof.

More specifically, the above-mentioned UV curable matrixes are commercially available under the following names: Sartomer CN104, Sartomer CN104A60, Sartomer CN104A80, Sartomer CN115, Sartomer CN292, Sartomer CN293, Sartomer CN294, Sartomer CN990, Sartomer CN2204, Sartomer CN2400, Sartomer SR306, Sartomer SR230, Sartomer SR610, Sartomer SR213, Sartomer SR502, Sartomer SR9035, Sartomer SR444, Sartomer SR285, and Sartomer SR256. Additionally, appropriate combinations of the above-mentioned UV curable matrix materials may be used to form the present UV curable ink having IR sensitivity. Further, the UV curable ink having IR sensitivity may include UV curable matrix material produced by any number of commercial providers including, but in no way limited to, Sartomer or Borden Chemical.

According to one exemplary embodiment of the UV curable matrix may comprise from between approximately 50 to 99.9% of the UV curable ink having IR sensitivity. More specifically, according to one exemplary embodiment, approximately 92.5% of the UV curable ink having IR sensitivity comprises UV curable matrix.

UV Photoinitiator

In addition to the above-mentioned UV curable matrix, a UV photoinitiator may also be included in the present UV curable ink having IR sensitivity. According to one exemplary embodiment, the UV photoinitiator is a reactive material that is configured to produce a polymerizing radical when exposed to a specific UV wavelength of light. The free radical is then configured to polymerize and cure the above-mentioned UV curable matrix. According to the present exemplary embodiment, UV photoinitiator may include, but is in no way limited to, alpha-hydroxy ketones, alpha-amino ketones, bis-acylphosphine oxide (BAPO) initiators, benzophenone, acrylated amine synergists, and alpha-hydroxy propanones.

According to the present exemplary embodiment, the UV photoinitiator may be commercially manufactured by Ciba® under the trade name IRGACURE® or DAROCUR®. Additionally, the present UV photoinitiators incorporated by the present UV curable ink having IR sensitivity may be activated by a wide UV spectral absorption range. Additional UV photoinitiator materials may be used from commercial providers including, but in no way limited to, Ciba® or Chitec Chemical.

According to one exemplary embodiment, the UV photoinitiator may comprise between approximately 0.010% and 15% of the of the UV curable ink having IR sensitivity. More specifically, according to one exemplary embodiment, the photoinitiator comprises approximately 2.5% of the UV curable ink having IR sensitivity.

IR Dye

Traditionally, UV curable inks have not included IR sensitive dyes because the IR dyes tended to bleach or experience chemical degradation upon exposure to the high intensity radiation used to cure the UV curable ink. Consequently, the present exemplary UV curable ink having IR sensitivity includes IR dyes which retain their IR sensitivity by not experiencing photochemical degradation even after exposure to high intensity radiation used to cure the UV curable ink.

As used in the present exemplary embodiment, the term IR dye may refer to any material which effectively absorbs radiation in the infra-red region of the electromagnetic spectrum. According to the present exemplary embodiment, the IR dye used in the UV curable ink having IR sensitivity include, but are in no way limited to, iodide compounds such as IR780 iodide (Aldrich 42,531-1) (2-[2-[2-Chloro-3-[(1,3-dihydro-3,3-dimethyl-1-propyl-2H-indo-2-ylidene)ethylidene]-1-cyclohexen-1-yl]ethenyl]-3,3-dimethyl-1-propylindolium iodide), whose chemical formula is illustrated by the chemical structure (I) below:

(I)

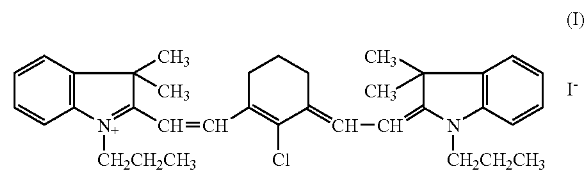

IR783 (Aldrich 54,329-2)(2-[2-[2-Chloro-3-[2-[1,3-dihydro-3,3-dimethyl-1-(4-sulfobutyl)-2H-indol-2-ylidene]-ethylidene]-1-cyclohexen-1-yl]-ethenyl]-3,3-dimethyl-1-(4-sulfobutyl)-3H-indolium hydroxide, inner salt sodium salt), whose chemical structure (II) is illustrated below:

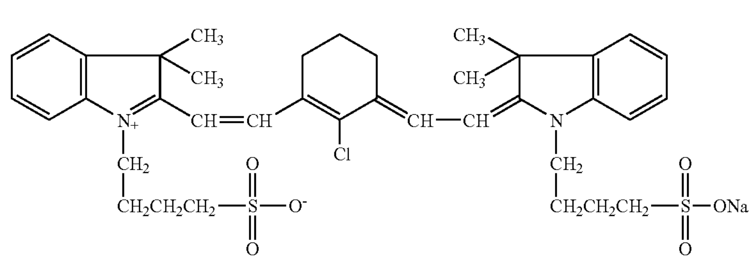

dithiophenylidene compounds such as Syntec 9/1 (3-(5-Dimethylamino-thien-2-yl )-5-(2,5-dihydro-5-dimethylimmonium-thien-2-ylidene)-1,2-dioxo-cyclopenten-4-olate) and Syntec 9/3 (3-(2-Piperidino-thien-2-yl)-5-(2,5-dihydro-4-methyl-2-[piperidin-1-ylidene-onium]-thien-5-ylidene)-1,2-dioxo-cyclopenten-4-olate), whose chemical structures (III, IV) are respectively illustrated below:

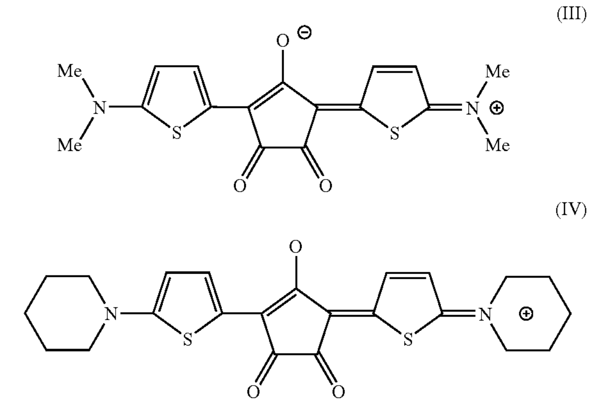

metal complex IR dyes such as dithiolane metal complexes having the general chemical structure (V):

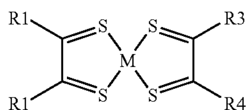

where M can be a transition metal, and R1-R4 can be lower alkyl or aryl groups with or without halo substituents and S can be S, NH, or Se; indoaniline metal complexes having chemical structures (VI) such as that illustrated below:

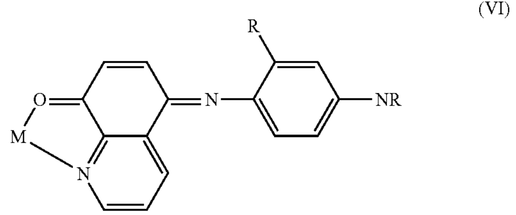

where M can be Ni, Cu, or another transition metal, and each R can independently be H, lower alkyl, and/or aryl groups with or without halo substituents; heterocyclic compounds; and combinations thereof.

In addition to the above-mentioned exemplary IR sensitive dyes, a number of near infrared absorbing dyes may also be incorporated into the present UV curable ink having IR sensitivity. Exemplary suitable near IR-absorbing dyes that may be incorporated into the present UV curable ink having IR sensitivity include, but are in no way limited to, 2-((2-((2-chloro-3-(((1,3-dihydro-1,3,3-trimethyl-2H-indol-2-ylidene)ethylidene)-1-cyclopenten-1-yl)ethenyl)-1,3,3-trimethyl-3H-indolium trifluoromethanesulfonate; Cyasorb® IR-165 Near IR Dye, American Cyanamid Co., Wayne, N.J. 07470 (absorption maximum at 1070 nm); and 4((((3-((((2,6-bis(1,10-dimethylethyl)-4H-thiopyrann-4-ylidene)methyl)-2-methyl)2-hydroxy-4-oxo-2-cyclobuten-1-ylidene) methyl-2,6-bis(1,1-dimethylethyl)thiopyrilium hydroxide, inner salt, Pisgah Labs, Pisgah Forest, N.C.

In addition to specific dyes as listed above, other suitable near IR dyes for this invention include, but are not limited to, those shown below: Heptamethine cyanine dyes having a chemical structure (VII) as shown below:

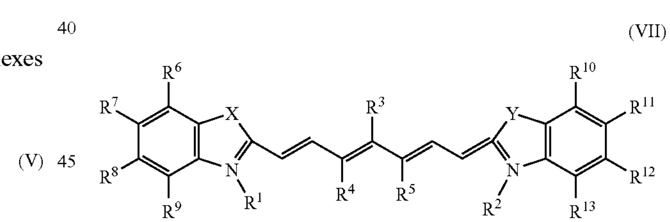

where R3 can be H, halogen, alkyl, aryl, aryl, alkoxy, aryloxy, thioalkyl, or thioaryl; R4 and R5 are independently selected from H, alkyl, aryl, or are bridged to form a cyclic attachment; each of R6 through R13 is independently selected from H, alkyl aryl, or any two adjacent R6 through R9 and any two adjacent R10 through R13 can form R10 through R13 can form a fused aryl; each of R1 and R2 are independently selected from alkyl, aryl and substituted alkyl; X and Y, which may or may not be identical, are each represented by the formula CR'R' where R', R" are independently selected from alkyl, aryl and substituted alkyl; X and Y, which may or may not be identical, are each represented by the formula CR'R" where R', R" are independently selected from H, C1-C6 alkyl, O, S, Se and Te. Choice of counterion for actionic dyes is dictated mainly by solubility requirements. Acceptable counterions include but at not limited to triflate, tosylate, perchlorate, hexafluorophosphate, tetrafluoroborate, iodide, chloride, bromide.

Benzenaminium dyes having a chemical structure (VIII) as shown below:

(VIII)

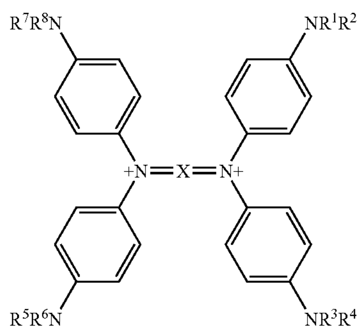

wherein each of $R^1$ through $R^8$ is independently selected from C1-C6 alkyl; X is a substituted 1,4-cyclohexadiene.

Squarylium dyes having structure (IX) or structure (X) as shown below:

(IX)

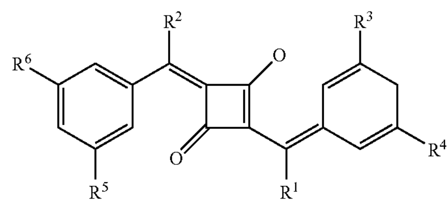

wherein each of R1 through R6 is independently selected from H, C1-C6 alkyl; X and Y are independently selected from O, S, Se, Te, N—R7, wherein R7 is selected from C1-C6 alkyl.

(X)

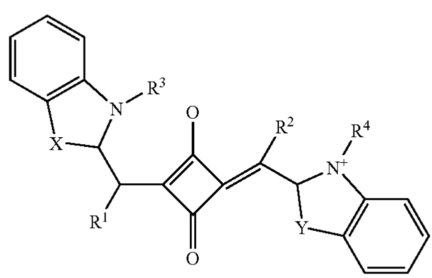

wherein each of R1 and R2 is independently selected from H, C1-C6 alkyl; each of X and Y is independently selected from O, S, Se, Te, N—R7, wherein R7 is selected from C1-C6 alkyl; each R3 and R4 is independently selected from alkyl, aryl or substituted alkyl. The benzene rings in structure (X) may be further substituted.

Additionally, according to one exemplary embodiment, the near IR-absorbing dyes may be selected from the group consisting of:

(XI)

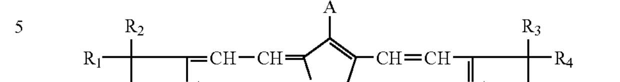

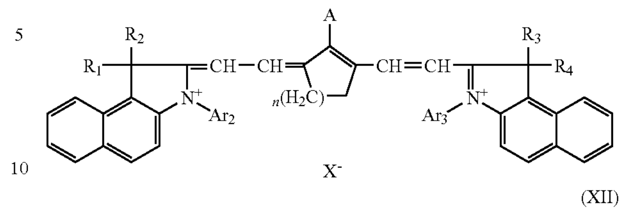

(XII)

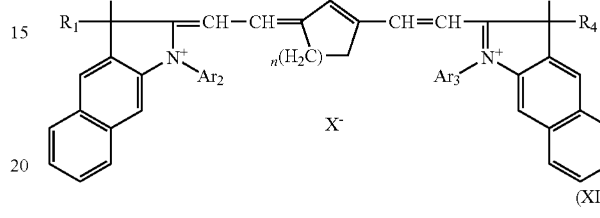

(XIII)

wherein R1-R4 are independently substituted or unsubstituted C1-C6 alkyl; A is substituted or unsubstituted phenyl, naphthyl, C1-C6 alkyl, or C7-C10 aralkyl; Ar2 and Ar3 are independently substituted or unsubstituted phenyl or naphthyl; X is a monovalent anion; and n is 1 or 2. In the near IR-absorbing dye structures given above that are substituted, the substitution of alkyl, aryl, or aralkyl groups independently can be with substituents that include, but are not limited to, hydroxy, alkoxy, chloro, bromo, cyano, and amino. Suitable near IR-absorbing dyes include, but are not limited to 2-(2(3-((1,1-dimethyl-1,3-dihydro-3-phenyl-2H-benz(e)indol-2-ylidene)ethylidene)-2-phenyl-1-cyclohexen-1-yl)ethenyl)-1,1-dimethyl-3-phenyl-1H-benz(e)indolium p-toluenesulfonate (JC-1); 2-(2(3-((1,1-dimethyl-1,3-dihydro-3-phenyl-2H-benz(e)indol-2-ylidene)ethylidene)-2-phenyl-1-cyclopenten-1-yl)ethenyl)-1,1-dimethyl-3-phenyl-1H-benz(e)indolium p-toluenesulfonate (JC-2); 2-(2(3-((1,1-dimethyl-1,3-dihydro-3-phenyl-2H-benz(f)indol-2-ylidene) ethylidene)-2-phenyl-1-cyclohexen-1-yl)ethenyl)-1,1-dimethyl-3-phenyl-1H-benz(f)indolium p-toluenesulfonate (JC-3); 2-(2(3-((1,1-dimethyl-1,3-dihydro-3-phenyl-2H-benz(f)indol-2-ylidene)ethylidene)-2-phenyl-1-cyclopenten-1-yl) ethenyl)-1,1-dimethyl-3-phenyl-1H-benz(f)indolium p-toluenesulfonate (JC-4); 2-(2(3-((1,1-dimethyl-1,3-dihydro-3-phenyl-2H-benz(g)indol-2-ylidene) ethylidene)-2-phenyl-1-cyclohexen-1-yl)ethenyl)-1,1-dimethyl-3-phenyl-1H-benz(g)indolium p-toluenesulfonate (JC-5); 2-(2(3-((1,1-dimethyl-1,3-dihydro-3-phenyl-2H-benz(g)indol-2-ylidene)ethylidene)-2-phenyl-1-cyclopenten-1-yl) ethenyl)-1,1-dimethyl-3-phenyl-1H-benz(g)indolium p-toluenesulfonate (JC-6).

Additional examples of infra-red dyes can be found in "Infrared Absorbing Dyes", Matsuoka, Masaru, ed., Plenum Press (1990) (ISBN 0-306-43478-4) and "Near-Infrared Dyes for High Technology Applications", Daehne, S.; Resch-Genger, U.; Wolfbeis, O., Ed., Kluwer Academic Publishers (ISBN 0-7923-5101-0), both incorporated herein by reference. Further examples of infra-red dyes that are sensitive to wavelengths varying from approximately 700 nm to 2000 nm are commercially available from H.W. Sands corporation, Sensient Chemicals, Yamamoto Chemicals, Midori Kogaku Co. Ltd., and Epolin Corporation.

According to the present exemplary embodiment, the above-mentioned IR and near IR dyes may comprise between approximately 0.01 to 30.0% of the UV curable ink having IR sensitivity. More specifically, according to one exemplary embodiment, the IR and near IR dye comprises approximately 5.0% of the UV curable ink having IR sensitivity. Further, the above-mentioned IR dye may be either completely or partially soluble in the resulting UV curable ink.

EXAMPLE

The above-mentioned components were selectively combined to form a UV curable ink having IR sensitivity. Once formed, the IR sensitivity of the UV curable ink both before and after UV curing was examined. According to the exemplary embodiment a Sartomer UV curable matrix was first blended as illustrated in Table 1 below:

TABLE 1

| Ingredient | Percentage by Weight |
|---|---|
| CN292 | 50.0% |
| CN293 | 15.0% |
| SR610 | 25.0% |
| SR213 | 10.0% |
| Total | 100% |
| | Batch (gm) |
| Viscosity (cP) | 270 |

Once the above-mentioned UV curable matrix formulation was generated, it was used to form two UV curable inks having IR sensitivity. The composition of each UV curable ink having IR sensitivity is illustrated below in Table 2.

TABLE 2

| Formulation | Dye | Dye wt. (g) | Photoinitiator IR819 | Sartomer Mix | Dye % |
|---|---|---|---|---|---|
| #1 | sda8737 | 0.1001 | 0.05 | 1.869 | 4.96% |
| #2 | pj900np | 0.1002 | 0.05 | 1.8541 | 5.00% |

As illustrated above in Table 2, formulation #1 includes approximately 5.0% near infrared dye in the form of SDA8737. SDA8737 is an infrared absorbing azo dye. Additionally, 0.05 grams of IR819 photoinitiator and 1.869 grams of the above-mentioned Sartomer mix were combined with the sda8737 to form the UV curable ink having IR sensitivity #1.

Similarly, formulation #2 included combining approximately 5.0% of the infrared absorbing dye pj900np with approximately 0.05 grams of IR819 photoinitiator and 1.8541 grams of the above-mentioned Sartomer mix to form the UV curable ink having IR sensitivity #2.

Figure 2:
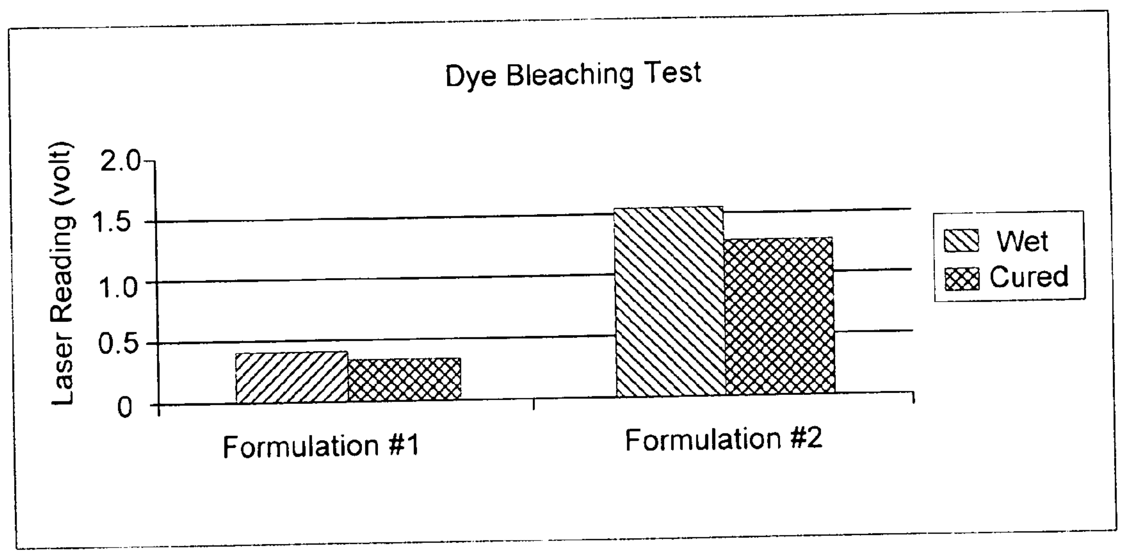
FIG. 2 is a bar graph illustrating the maintenance of IR sensitivity after UV curing, according to one exemplary embodiment.

Once formed, the UV curable ink formulations having IR sensitivity #1 and #2 were applied on the back side of a substrate using a wire-wound metering rod often referred to as a Meyer rod to obtain coating of approximately 6 microns thick. The IR sensitivity of the wet coating was then measured using a laser IR sensor tuned to a radiation wavelength of approximately 940 nm. After the IR sensitivity of the wet coating was evaluated, the coating was then cured using a Fusion UV System to form a scratch resistant coating. Once cured, the IR sensitivity of the coating was again measured using the laser UV sensor tuned to a radiation wavelength of approximately 940 nm. FIG. 2 illustrates the results of the measured IR sensitivity.

As illustrated in FIG. 2, the IR sensor reading of formulation #1 in a wet condition produced a UV sensitivity reading of approximately 0.41 volts and a UV sensitivity reading of approximately 0.34 volts after curing. Consequently, the IR sensitivity dye did not experience a substantial amount of photochemical degradation during the curing process. Similarly, as illustrated in FIG. 2, formulation #2 produced a UV sensitivity reading of approximately 1.53 volts when in the uncured state and approximately 1.26 volts after being cured. These results illustrate a resistance to photochemical degradation during the UV intense curing process.

In conclusion, the present system and method for formulating a UV curable ink containing IR dyes which retain their IR sensitivity (i.e. do not undergo photochemical degradation) even after exposure to high intensity radiation used for curing the ink is disclosed herein. More specifically, according to one exemplary embodiment, the UV curable ink having IR dyes which retain their IR sensitivity includes a UV curable matrix, a UV photoinitiator, and an IR sensitive dye. As a result, the present UV curable ink may be used to reliably apply an IR sensitive dye to a desired medium for any number of purposes including object tracking and/or authentication.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. An ultraviolet (UV) curable ink having infrared (IR) sensitivity comprising:

an ultraviolet (UV) light curable matrix;

a UV photoinitiator; and an IR sensitive dye that remains effective as a marking agent when selectively exposed to IR light following curing of said matrix with said UV light;

wherein said UV photoinitiator comprises between approximately 0.01% and 15.0% by weight of said UV curable ink.

2. The ink of claim 1, wherein said UV photoinitiator comprises approximately 2.5% by weight of said UV curable ink.

3. An ultraviolet (UV) curable ink having infrared (IR) sensitivity comprising:

an ultraviolet (UV) light curable matrix;

a UV photoinitiator; and an IR sensitive dye that remains effective as a marking agent when selectively exposed to IR light following curing of said matrix with said UV light;

wherein said IR sensitive dye comprise a near IR absorbing dye;

wherein said near IR absorbing dye comprises one of a heptamethine cyanine dye, a benzenaminium dye, or a squarylium dye; and wherein said near IR absorbing dye comprises one of a 2-(2(3-((1,1-dimethyl-1,3-dihydro-3-phenyl-2H-benz(e)indol-2-ylidene)ethylidene)-2-phenyl-1-cyclohexen- 1-yl)ethenyl)-1, a 1-dimethyl-3-phenyl-1H-benz(e)indolium p-toluenesulfonate, a 2-(2(3-((1,1-dimethyl-1,3-dihydro-3-phenyl-2H-benz(e)indol-2-ylidene) ethylidene)-2-phenyl-1-cyclopenten-1-yl)ethenyl)-1, a 1-dimethyl-3-phenyl-1H-benz(e)indolium p-toluenesulfonate, a 2-(2(3-((1,1-dimethyl-1,3-dihydro-3-phenyl-2H-benz(f)indol-2-ylidene)ethylidene)-2-phenyl-1-cyclohexen-1-yl)ethenyl)-1, a 1-dimethyl-3-phenyl-1H-benz(f)indolium p-toluenesulfonate, a 2-(2(3-((1,1-dimethyl-1,3-dihydro-3-phenyl-2H-benz(f)indol-2-ylidene)ethylidene)-2-phenyl-1-cyclopenten-1-yl) ethenyl)-1, a 1-dimethyl-3-phenyl-1H-benz(f)indolium p-toluenesulfonate, a 2-(2(3-((1,1-dimethyl-1,3-dihydro-3-phenyl-2H-benz(g)indol-2-ylidene)ethylidene)-2-phenyl-1-cyclohexen-1-yl)ethenyl)-1, a 1-dimethyl-3-phenyl-1H-benz(g)indolium p-toluenesulfonate, a 2-(2(3-((1,1-dimethyl-1,3-dihydro-3-phenyl-2H-benz (g)indol-2-ylidene)ethylidene)-2-phenyl-1-cyclopenten-1-yl)ethenyl)-1, or a 1-dimethyl-3-phenyl-1H-benz(g)indolium p-toluenesulfonate.

4. An ultraviolet (UV) curable ink having infrared (IR) sensitivity comprising:

an ultraviolet (UV) light curable matrix including one of an epoxy oligomer or an acrylate oligomer;

a UV photoinitiator including one of an alpha-hvdroxv ketone, an alpha-amino ketone, a bis-acylphosphine oxide (BAPO) initiator, a benzophenone, an acrylated amine synergists, or an alpha-hydroxy propanone; and an IR sensitive dye including an IR absorbing dye or a near IR absorbing dye;

wherein:

said UV light curable matrix comprises approximately 92.5% by weight of said UV curable ink;

said UV photoinitiator comprises approximately 2.5% by weight of said UV curable ink; and said IR sensitive dye comprises approximately 5.0% by weight of said UV curable ink.

* * * * *

UNITED STATES PATENT AND TRADEMARK OFFICE

CERTIFICATE OF CORRECTION

PATENT NO. : 7,741,379 B2
APPLICATION NO. : 11/069868
DATED : June 22, 2010
INVENTOR(S) : C. Bhatt It is certified that error appears in the above-identified patent and that said Letters Patent is hereby corrected as shown below:

In column 12, line 5, in Claim 4, delete "hvdroxv" and insert -- hydroxy --, therefor.

Signed and Sealed this
Nineteenth Day of April, 2011

David J. Kappos
*Director of the United States Patent and Trademark Office*